US011520893B2

(12) United States Patent
Tateyama et al.

(10) Patent No.: US 11,520,893 B2
(45) Date of Patent: Dec. 6, 2022

(54) INTEGRATED CIRCUIT AND CONTROL METHOD OF INTEGRATED CIRCUIT

(71) Applicant: KYOCERA Document Solutions Inc., Osaka (JP)

(72) Inventors: Yoshitaka Tateyama, Osaka (JP); Masato Shiose, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 245 days.

(21) Appl. No.: 16/885,056

(22) Filed: May 27, 2020

(65) Prior Publication Data

US 2020/0380135 A1 Dec. 3, 2020

(30) Foreign Application Priority Data

May 30, 2019 (JP) .............................. JP2019-100841

(51) Int. Cl.
*G06F 21/57* (2013.01)
*G06F 21/56* (2013.01)
*G06F 9/4401* (2018.01)

(52) U.S. Cl.
CPC .......... *G06F 21/575* (2013.01); *G06F 9/4401* (2013.01); *G06F 21/566* (2013.01); *G06F 2221/034* (2013.01)

(58) Field of Classification Search
CPC .... G06F 21/575; G06F 9/4401; G06F 21/566; G06F 2221/034
See application file for complete search history.

(56) References Cited

U.S. PATENT DOCUMENTS

| 9,639,425 | B1* | 5/2017 | Mishra | G06F 11/2284 |
|---|---|---|---|---|
| 10,229,271 | B2* | 3/2019 | Kim | G06F 21/575 |
| 10,762,210 | B2* | 9/2020 | Jarmany | G06F 9/4401 |
| 2006/0242429 | A1 | 10/2006 | Holtzman et al. | |
| 2007/0180539 | A1 | 8/2007 | Holtzman et al. | |
| 2007/0283140 | A1* | 12/2007 | Jones | G06F 9/4403 713/2 |
| 2015/0186651 | A1* | 7/2015 | Kim | G06F 21/74 713/2 |

(Continued)

FOREIGN PATENT DOCUMENTS

GB 2459036 A * 10/2009 ............ G06F 21/22
JP 2008-524969 A 7/2008

OTHER PUBLICATIONS

Banala et al, "Secure Interface Architecture for Charge Trap Transitor (CTT) Based EEPROM", Nov. 21, 2019, IEEE, p. 219-222.*

*Primary Examiner* — Christopher A Revak
(74) *Attorney, Agent, or Firm* — Studebaker & Brackett PC

(57) ABSTRACT

An integrated circuit includes a data processing part, a data management part. The data processing part processes data. The data management part manages security of the data processing part. The security management part includes a set value holding part, a start control part and a state control part. The set value holding part holds a set value of security strength. The start control part starts the integrated circuit by secure boot which performs signature verification on a boot program in a case where the security strength shown by the set value is over a predetermined level. The state control part resets the data processing part when falsification of the boot program is detected by the signature verification in the secure boot.

13 Claims, 4 Drawing Sheets

(56) References Cited

U.S. PATENT DOCUMENTS

2018/0330095 A1* 11/2018 Packer Ali ............ H04L 9/3247
2019/0065751 A1*  2/2019 Srinivas ................ G06F 21/566
2019/0087578 A1*  3/2019 Govindarajan ....... G06F 21/575

* cited by examiner

INTEGRATED CIRCUIT AND CONTROL METHOD OF INTEGRATED CIRCUIT

INCORPORATION BY REFERENCE

This application is based on and claims the benefit of priority from Japanese patent application No. 2019-100841 filed on May 30, 2019, which is incorporated by reference in its entirety.

BACKGROUND

The present disclosure is related to an integrated circuit and a control method of the integrated circuit.

An information processing apparatus such as an image forming apparatus is provided with an integrated circuit to perform various processing. For example, the image forming apparatus such as a multi functional peripheral is provided with a large scale integration (LSI) to perform an image forming processing.

In the above LSI, data requiring security protection may be handled, and a technique to protect the data from a security threat has been proposed in recent years. For example, in a memory system containing a flash memory, there is a method in which an encryption engine encrypts and decrypts the data input and output to and from an external device based on security configuration information set by a CPU previously. According to the method, it becomes possible to prevent unintended leakage of the data to the external device.

By the way, when the integrated circuit is affected with a security threat, firmware (FW) of the integrated circuit is falsified, and the integrated circuit may operate abnormally.

On the other hand, the above method controls the encryption engine based on the security configuration information set by the CPU. Thereby, when the FW is falsified by the security threat and the CPU operates abnormally, the encryption engine may not operate normally. In this case, there is a possibility that the security of the system is not protected by unintended leakage of the data to the external device.

SUMMARY

In accordance with an aspect of the present disclosure, an integrated circuit includes a data processing part, a data management part. The data processing part processes data. The data management part manages security of the data processing part. The security management part includes a set value holding part, a start control part and a state control part. The set value holding part holds a set value of security strength. The start control part starts the integrated circuit by secure boot which performs signature verification on a boot program in a case where the security strength shown by the set value is over a predetermined level. The state control part resets the data processing part when falsification of the boot program is detected by the signature verification in the secure boot.

In accordance with an aspect of the present disclosure, a control method of an integrated circuit including a data processing part processing data and a security management part managing security of the data processing part, includes a start control process and a connection control process. In the start control process, the integrated circuit is started by secure boot which performs signature verification on a boot program when the security management part previously holds a set value of security strength and the security strength shown by the set value is over a predetermined level. In the connection control process, the security management part resets the data processing part when falsification of the boot program is detected by the signature verification in the secure boot.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, an integrated circuit according to one embodiment of the present disclosure will be described with reference to the drawings.

(Configuration of Integrated Circuit)

Figure 1:
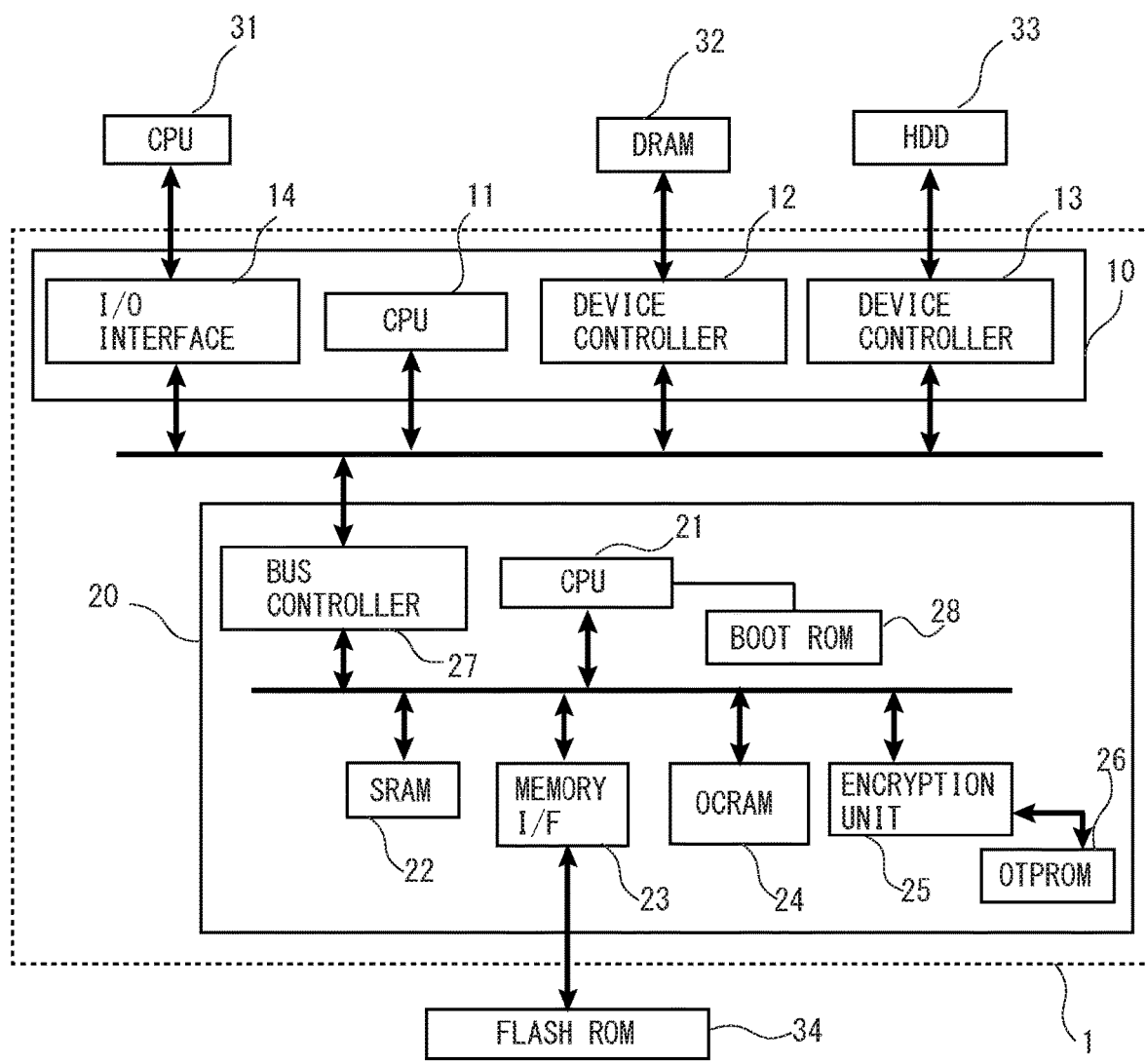
FIG. 1 is a block diagram showing an example of a configuration of an integrated circuit according to one embodiment of the present disclosure.

FIG. 1 is a block diagram showing an example of a configuration of an integrated circuit according to the embodiment of the present disclosure. As shown in FIG. 1, the integrated circuit 1 includes a data processing part 10 and a security management part (SCU) 20. The integrated circuit 1 is an LSI, such as a system on a chip (SoC) and an application specific integrated circuit (ASIC) provided on an information processing apparatus such as an image forming apparatus. The integrated circuit 1 is connected to a CPU 31 (hereinafter, called an external CPU 31), a DRAM 32, an HDD 33 and a flash ROM 34, and inputs and outputs data to and from these external devices 31 to 34. To the integrated circuit 1, another external device may be connected.

The data processing part 10 includes a CPU 11 (hereinafter, called a main CPU 11), device controllers 12 and 13, and an I/O interface 14.

The device controller 12 is a DDR memory controller (DDRMC), and controls the DRAM 32. Memories other than the DRAM may be connected to the device controller 12. That is, the device controller 12 may be a controller which controls a memory other than a DRAM.

The device controller 13 controls the HDD 33. In the present embodiment, the device controller 13 and the HDD 33 are connected by a serial ATA (SATA). The device controller 13 has a full disk encryption function, and makes it possible to encrypt the data stored in the HDD 33 collectively. The device controller 13 makes it possible to encrypt the data stored in the HDD 33 by a sector unit. A storage connected to the device controller 13 is not limited to the HDD, and a solid state drive (SSD) of SATA may be connected. Alternatively, a storage of an interface other than SATA may be connected.

The device controllers 12 and 13 have a function as an input/output data monitoring part which monitors the data input and output to and from the DRAM 32 and the HDD 33 and generates a hardware interrupt when a plain text is detected.

The I/O interface 14 is a serial interface. In the present embodiment, the I/O interface 14 is a PCI express endpoint (PCIeEP).

The security management part 20 manages security of the integrated circuit 1. The security management part 20 includes a CPU 21 (hereinafter, called a sub CPU 21), a SRAM 22, a memory I/F 23, an OCRAM (a built-in memory) 24, an encryption unit 25 and a one time programmable (OTP) ROM 26. The security management part 20 includes a boot ROM 28 and a bus controller 27.

The memory I/F 23 is an interface which connects the flash ROM 34. In the present embodiment, the flash ROM 34 stores a program (called a startup program or a boot program) to start the integrated circuit 1. The OTPROM 26 functions as a set value holding part which holds a set value of security strength described below. The OTPROM 26 stores information (for example, secret key) used in the encryption unit 25.

The bus controller 27 controls a bus which connects the data processing part 10 to the security management part 20.

(Security Protection of Integrated Circuit)

The security management part 20 switches the security strength of the integrated circuit 1 according to a set value of the security strength held in the OTPROM 26. In the present embodiment, when the set value of the security strength is 0, the security management part 20 sets the security strength to "non-secure". On the other hand, when the set value of the security strength is 1, the security management part 20 sets the security strength to "secure". The security strength may have three or more levels, not limited to two levels of 0 and 1. For example, the "secure" level may be set by multiple steps.

When the security strength is set to "secure", the bus controller 27 interrupts an interface (a bus) between the data processing part 10 and the security management part 20. This makes it possible to protect the security management part 20 from an external security threat.

When the security strength is set to "secure", secure boot is performed when a power source turns on the integrated circuit 1. The secure boot will be described in detail later with reference to FIG. 3. When the security threat is detected during the secure boot, the security management part 20 resets the data processing part 10. This makes it possible to inhibit an abnormal operation of the data processing part 10 due to the security threat.

In addition, in a case where the security strength is set to "secure", when a hardware interruption showing detection of plain text is received from the device controllers 12 and 13, the security management part 20 verifies validity of the plain text. When the plain text is unauthorized, the security management part 20 resets the data processing part 10. Here, the verification of "validity of the plain text" does not mean the verification of the content of the plain text, but means whether the output of the plain text is possible. For example, when the data read from a sector (called an encrypted data storage region) in which the encrypted data is to be stored in the HDD 33 is a plain text, the security management part 20 determines that the plain text is unauthorized plain text.

When the security strength is set to "non-secure", the secure boot is not performed when the power source turns on, and the integrated circuit 1 boots normally. The bus controller 27 opens the interface between the data processing part 10 and the security management part 20.

When the OTPROM 26 is in an initial state, such as when the integrated circuit 1 is manufactured, the above set information does not exist in the OTPROM 26. In this case, there is a possibility where the security protection of the data processing part 10 by the security management part 20 does not function or unintended leakage of the data to the external devices 31 to 34 occurs. Then, in the present embodiment, when the OTPROM 26 is in the initial state, the security management part 20 controls the bus controller 27 to interrupt the interface (the bus) between the data processing part 10 and the security management part 20. This makes it possible to protect the security management part 20 from the external security threat. Additionally, the security management part 20 resets the data processing part 10. This makes it possible to inhibit the abnormal operation of the data processing part 10 due to the security threat.

(Security Management Part)

Figure 2:
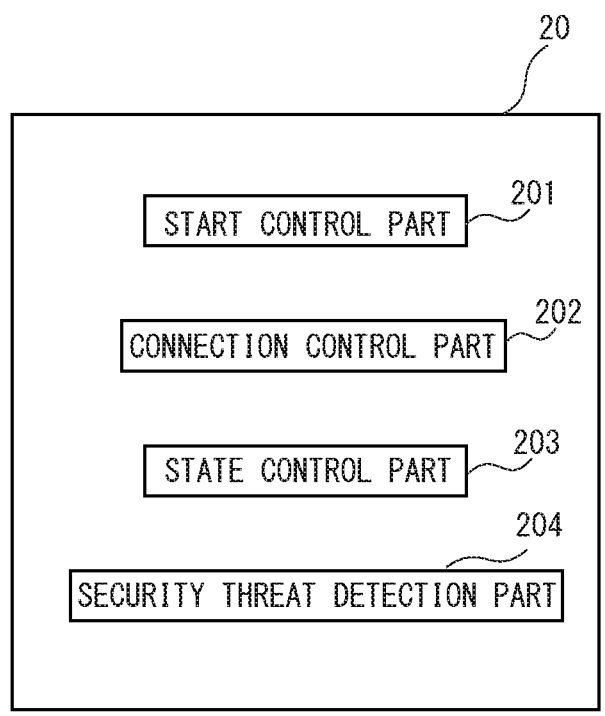
FIG. 2 is a view showing a functional block of a security management part.

FIG. 2 is a diagram showing a functional block of the security management part 20. The sub CPU 21 of the security management part 20 reads and performs, for example, the computer program stored in the flash ROM 34, and functions as a start control part 201, a connection control part 202, a state control part 203 and a security threat detection part 204.

The start control part 201 switches boot sequence of the integrated circuit 1 based on the set value of the security strength held in the OTPROM 26. In the present embodiment, when the set value of the security strength is over the predetermined value (here, 1), that is, when the security strength is over the predetermined level, the start control part 201 executes secure boot which performs signature verification on the boot program. The secure boot will be described in detail later with reference to FIG. 3. On the other hand, when the security strength is less than the predetermined level, the start control part 201 executes normal boot which does not perform the signature verification on the boot program.

The connection control part 202 uses the bus controller 27 to interrupt or to open the connection to the data processing part 10 based on the set value of the security strength held in the OTPROM 26. In the present embodiment, when the set value of the security strength is over the predetermined value, that is, when the security strength is over the predetermined level, the connection control part 202 interrupts the connection to the data processing part 10. In a case where the security strength is over the predetermined level, the interruption of the connection to the data processing part 10 may be performed as needed (for example, during the execution of the secure boot, or when the security threat is detected).

The state control part 203 resets the data processing part 10 when falsification of the boot program is detected in the signature verification of the secure boot. The state control part 203 resets the data processing part 10 when the security threat is detected in a case where the set value of the security strength is over the predetermined value. In the present embodiment, between the sub CPU 21, and the main CPU 11 and the device controllers 12 and 13 of the data processing part 10, signal lines (not shown) are provided for reset signal. The sub CPU 21 outputs a control signal switching between a reset state and a reset release state, to the main CPU 11 and the device controllers 12 and 13 through the above signal lines.

The security threat detection part 204 determines the validity of the plain text when the hardware interruption showing the detection of the plain text is received from the device controllers 12 and 13. When the plain text is unauthorized, the security threat detection part 204 determines that the data processing part 10 is affected with the security threat.

(Secure Boot)

Figure 3:
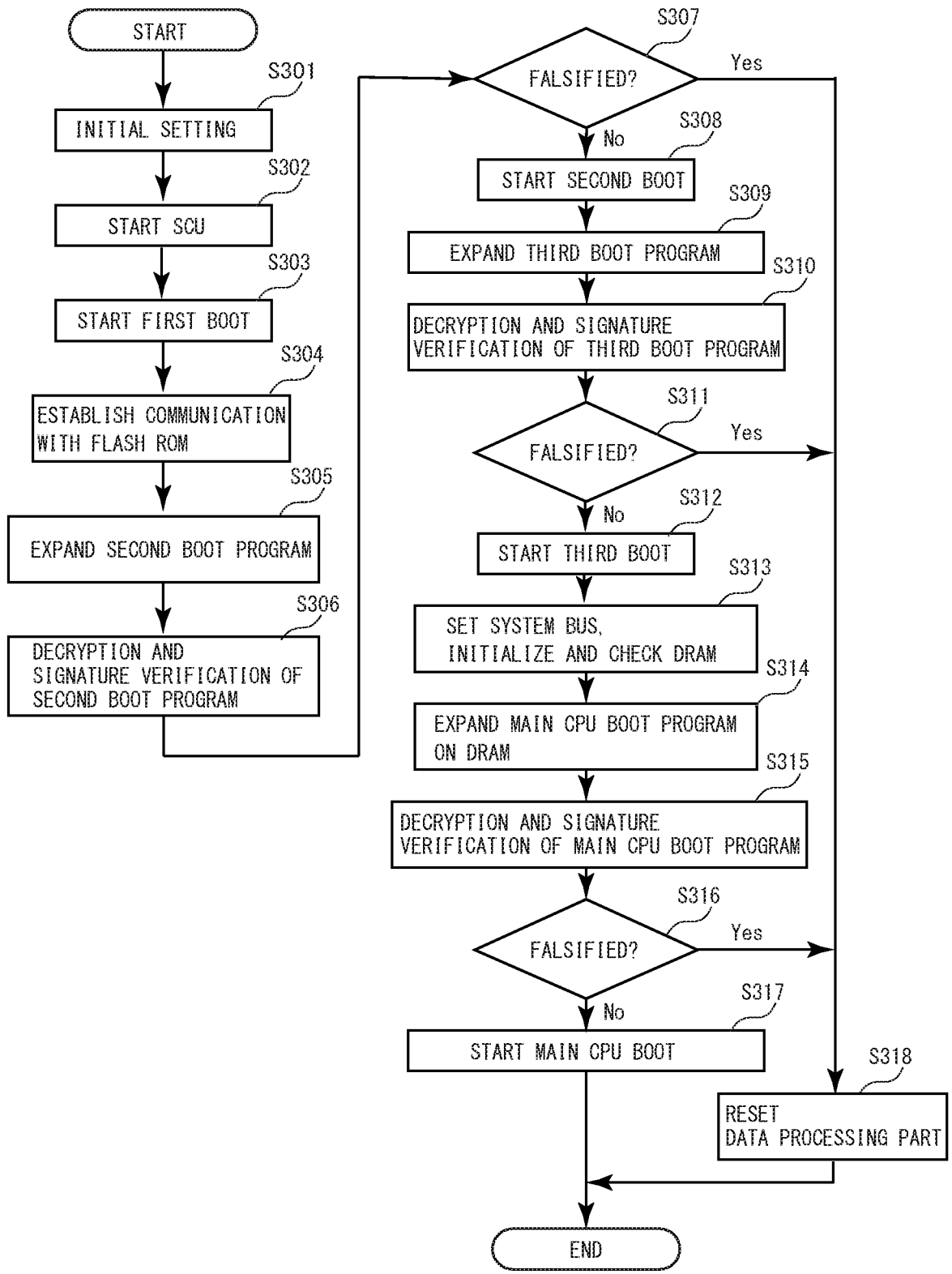
FIG. 3 is a flowchart showing an example of processing flow of secure boot.
Figure 4:
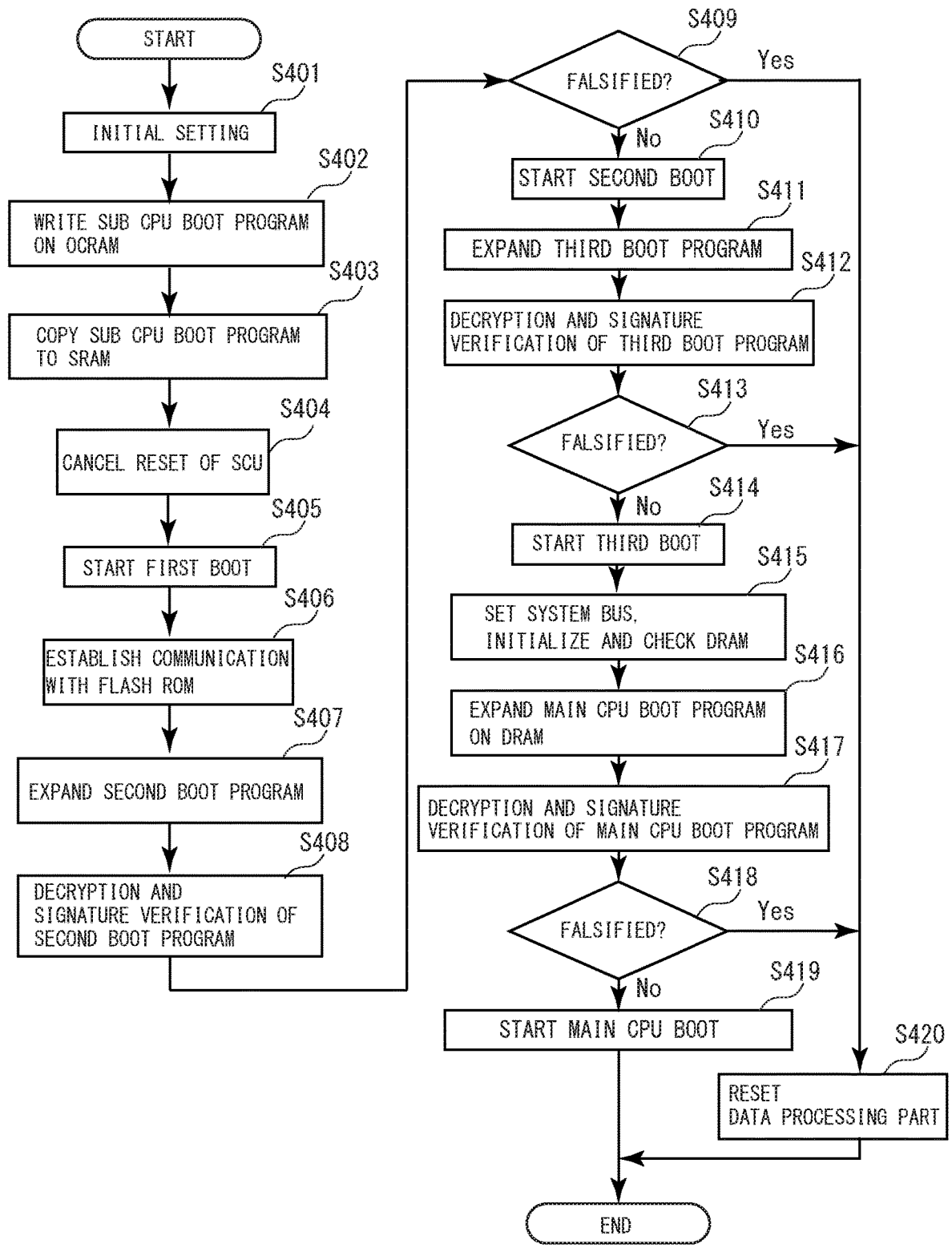
FIG. 4 is a flowchart showing another example of processing flow of secure boot.

In the secure boot, the security management part 20 decrypts FW loaded from the external device, and performs the signature verification on the decrypted FW. When falsification of the FW is detected in the signature verification, the security management part 20 resets the data processing part 10. FIG. 3 is a flowchart showing a processing flow of the secure boot according to the embodiment of the present disclosure. FIG. 3 shows the flow when the built-in CPU (the main CPU 11 of the data processing part 10) of the integrated circuit 1 is started by the secure boot. Here, as shown in FIG. 1, the flash ROM 34 is connected to the security management part 20.

When the power source turns on the integrated circuit 1, as shown in FIG. 3, an initial setting of the inside of the integrated circuit 1 is performed (step S301), and the security management part 20 starts (step S302). Then, the sub CPU 21 of the security management part 20 reads a first boot program stored in the boot ROM 28, and starts a first start processing (a first boot sequence) according to the first boot program (step S303). In the first start processing, the sub CPU 21 establishes a communication with the flash ROM 34 (step S304). Then, the sub CPU 21 reads a second boot program from the flash ROM 34, and expands the second boot program on the SRAM 22 (step S305). Here, it is assumed that the second boot program is encrypted. When the second boot program is not encrypted, after the step S305, the processing proceeds to step S308.

Next, the sub CPU 21 decrypts the second boot program expanded on the SRAM 22 by the encryption unit 25, and performs the signature verification (step S306). As the result of the signature verification, when the falsification is detected (step S307: Yes), the sub CPU 21 resets the data processing part 10 (step S318), and the processing is finished. When the falsification is not detected (step S307: No), the sub CPU 21 starts a second start processing (a second boot) according to the second boot program (step S308).

In the second start processing, the sub CPU 21 reads a third boot program from the flash ROM 34, and expands the third program on the SRAM 22 (step S309). Here, it is assumed that the third boot program is encrypted. When the third boot program is not encrypted, the processing proceeds to step S312.

Next, the sub CPU 21 decrypts the third boot program expanded on the SRAM 22 by the encryption unit 25, and performs the signature verification (step S310). As the result of the signature verification, when the falsification is detected (step S311: Yes), the sub CPU 21 resets the data processing part 10 (step S318), and the processing is finished. When the falsification is not detected (step S311: No), the sub CPU 21 starts a third start processing (a third boot) according to the third boot program (step S312).

In the third start processing, the sub CPU 21 sets a system bus, initializes the DRAM 32 and performs a memory check of the DRAM 32 (step S313). Then, the DRAM 32 becomes available. The sub CPU 21 reads the boot program (hereinafter, called a main CPU boot program) of the main CPU 11 from the flash ROM 34, and expands the boot program on the DRAM 32 (step S314). Here, it is assumed that the main CPU boot program is encrypted. When the main CPU boot program is not encrypted, after step S314, the processing proceeds to step S317.

Next, the sub CPU 21 decrypts the main CPU boot program expanded on the DRAM 32 by the encryption unit 25, and performs the signature verification (step S315). As the result of the signature verification, when the falsification is detected (step S316: Yes), the sub CPU 21 resets the data processing part 10 (step S318), and the processing is finished. When the falsification is not detected (step S316: No), the sub CPU 21 cancels the reset of the main CPU 11. The main CPU 11 whose reset is canceled starts a start processing (a main CPU boot) according to the main CPU boot program (step S317). When the main CPU boot is finished, the processing is finished.

In the above manner, the built-in CPU (the main CPU 11) of the integrated circuit 1 is started in the secure boot.

A case where the main CPU 11 of the data processing part 10 is not used, for example a case where the external CPU 31 is used as the main CPU may be supposed. In such a case, after steps S301 and S302, the external CPU 31 may perform the processing of steps S303 to S312. In this case, the processing after step S313 is not performed.

Alternatively, a case where the external CPU 31 starts the integrated circuit 1 may be supposed. FIG. is a flowchart showing the processing flow of the secure boot of the integrated circuit 1, performed in such a case. Here, the flash ROM 34 is connected to the external CPU 31, not the security management part 20.

When the power source turns on the integrated circuit 1 and the external CPU 31, firstly, the initial setting of the inside of the integrated circuit 1 is performed (step S401). Next, the reset of the external CPU 31 is canceled, and the initializing processing and a linking-up of the I/O interface 14 are performed. Then, the external CPU 31 writes the boot program of the sub CPU 21 stored in the flash ROM 34 into the OCRAM 24 accessible from an exterior of the security management part 20 (step S402). In this case, the bus controller 27 temporarily opens the interface between the data processing part 10 and the security management part 20.

Next, the external CPU 31 copies the boot program of the sub CPU 21 wrote into the OCRAM 24 to the SRAM 22 of the security management part 20 (step S403). Then, the external CPU 31 cancels the reset of the sub CPU 21 (step S404). The sub CPU 21 whose reset is canceled reads the first boot program stored in the boot ROM 28, and starts the first start processing (the first boot) according to the first boot program (step S405). The processing from steps S406 to S420 are the same as the processing from steps S304 to S318, and their explanation is omitted.

In the above manner, by writing the boot program of the sub CPU 21 into the OCRAM 24 of the security management part 20, it becomes possible to perform the secure boot even if the flash ROM 34 is connected to the external CPU 31.

As described above, the integrated circuit 1 of the present embodiment includes the data processing part 10 processing the data, and the security management part 20 managing the security of the data processing part 10. The security management part 20 includes the start control part 201 which starts the integrated circuit 1 by the secure boot which performs the signature verification on the boot program when the security strength shown by the set value held in the set value holding part (OTPROM 26) is over the predetermined level. The security management part 20 includes the state control part 203 which resets the data processing part 10 when the falsification of the boot program is detected by the signature verification in the secure boot.

In the above manner, the security management part 20 of the present embodiment is configured to switch the boot sequence based on the set value of the security strength held therein. Accordingly, even under a condition where the security threat for the data processing part 10 exists, it becomes possible to start the integrated circuit 1 safely.

Additionally, because the data processing part 10 is reset when the falsification of the FW is detected, it becomes possible to prevent the unintended leakage of the data in the integrated circuit 1 surely. Therefore, according to the present embodiment, it becomes possible to protect the integrated circuit 1 and the data in the integrated circuit 1 from the security threat.

The security management part 20 further includes the connection control part 202 which interrupts the connection to the data processing part 10 when the security strength shown by the above set value held in the set value holding part is over the predetermined level. Especially, the connection control part 202 interrupts the connection to the data processing part 10 when the security threat for the data processing part 10 is detected in a case where the security strength shown by the above set value held in the set value holding part is over the predetermined level. Thereby, by setting the security strength to over the predetermined level, the connection to the data processing part 10 can be interrupted so that it becomes possible to protect the inside of the security management part 20 surely even if the data processing part 10 is affected with the security threat.

The connection control part 202 interrupts the connection to the data processing part 10 when the set value holding part does not hold the set value of the security strength. Thereby, when the OTPROM 26 is in the initial state and does not hold the above set value and the secret key, such as when the integrate circuit 1 is manufactured, even if the data processing part 10 is affected with the security threat, it becomes possible to protect the security management part 20 from the security threat.

The state control part 203 resets the data processing part 10 when the set value holding part does not hold the set value of the security strength. Thereby, when the OTPROM 26 is in the initial state and does not hold the set value and the secret key, such as when the integrate circuit 1 is manufactured, even if the data processing part is affected with a security threat, it becomes possible to inhibit an abnormal operation of the data processing part 10. By inhibiting the abnormal operation of the data processing part 10, it becomes possible to protect not only the data processing part but also the external device connected to the data processing part 10 and the data stored in the external device.

The data processing part 10 includes the input/output data monitoring part (the device controllers 12 and 13) which monitors the data input and output to and from the external devices (the DRAM 32, the HDD 33). The security management part 20 further includes the security threat detection part 204 which detects the security threat to the data processing part 10. The security threat detection part 204 detects the security threat when the input/output monitoring part detects the unauthorized plain text in a case where the security strength shown by the above set value held in the set value holding part is over the predetermined level. Thereby, when the unauthorized plain text is detected, it becomes possible to protect the security management part 20 from the security threat which is a factor thereof.

Furthermore, when the data input and output to and from the external device is the date read from the encryption storage area and plain text is detected from the data, the security threat detection part 204 determines that the plain text is unauthorized. Thereby, it becomes possible to detect that the data in the encryption storage region of the external device and the integrated circuit is falsified, and it becomes possible to prevent unauthorized FW from being written into the integrated circuit 1 and to prevent unauthorized data from being input to the integrated circuit 1.

The security management part 20 further includes the built-in memory (the OCRAM) 24 into which the boot program is written from the exterior of the integrated circuit 1. When the boot program is written into the built-in memory 24, the start control part 201 performs the signature verification on the boot program written into the built-in memory 24 in the secure boot and starts the integrated circuit 1 using the boot program. Thereby, even if the flash ROM 34 storing the boot program is connected to the external CPU 31 not the security management part 20, it becomes possible to execute the secure boot accompanied with the signature verification. Accordingly, it becomes possible to provide a flexibility to the configuration of the integrated circuit and to protect the integrated circuit having a different configuration from the configuration shown in FIG. 1 from the security threat.

When the set strength of security is less than the predetermined level, the start control part 201 starts the integrated circuit 1 by normal boot which does not perform the signature verification. Thereby, under a condition where the security protect is not necessary and a condition where the encryption is not allowed, it becomes possible to use the integrated circuit 1 by setting the security strength to be less than the predetermined level.

A process where the start control part 201 of the security management part 20 starts the integrated circuit 1 by the secure boot when the security strength shown by the set value held in the OTPROM 26 is over the predetermined level is a specific example of a start control process in a control method of the integrated circuit 1. A process where the state control part 203 of the security management part 20 resets the data processing part 10 when the falsification of the boot program is detected by the signature verification in the secure boot is an example of a connection control process in the control method of the integrated circuit 1.

It should be noted that the present disclosure can be suitably modified within a scope that is not opposed to the summary and the idea of the disclosure which can be read from the claims and the entire specification, and the integrated circuit and the control method of the integrated circuit are also included in the technical idea of the present disclosure.

The invention claimed is:

1. An integrated circuit comprising:
   a data processing part which processes data; and
   a data management part which manages security of the data processing part, wherein
   the security management part includes:
   an encryption unit which decrypts a boot program;
   a set value holding part which holds a set value of security strength and a secret key used in the encryption unit;
   a start control part which starts the integrated circuit by secure boot which performs signature verification on a boot program in a case where the security strength shown by the set value is over a predetermined level; and
   a state control part which resets the data processing part when falsification of the boot program is detected by the signature verification in the secure boot.

2. The integrated circuit according to claim 1, wherein the security management part further includes a connection control part which interrupts connection to the data processing part in the case where the security strength shown by the set value is over the predetermined level.

3. The integrated circuit according to claim 2, wherein the connection control part interrupts the connection to the data processing part when a security threat on the data processing part is detected in the case where the security strength shown by the set value is over the predetermined level.

4. The integrated circuit according to claim 2, wherein the connection control part interrupts the connection to the data processing part when the set value holding part does not hold the set value.

5. The integrated circuit according to claim 1, wherein the state control part resets the data processing part when the set value holding part does not hold the set value.

6. The integrated circuit according to claim 1, wherein
the data processing part includes an input/output data monitoring part which monitors data input and output to and from an external device, and
the data management part further includes a security threat detection part which detects a security threat on the data processing part, and
the security threat detection part detects the security threat when plain text detected by the input/output data monitoring part is unauthorized in the case where the security strength shown by the set value is over the predetermined level.

7. The integrated circuit according to claim 6, wherein when the data input and output to and from the external device is data read from an encryption storage region and plain text is read from the data, the security threat detection part determines that the plain text is unauthorized.

8. The integrated circuit according to claim 1, wherein
the security management part includes a built-in memory into which the boot program can be written from an exterior of the integrated circuit,
when the boot program is written into the built-in memory, the start control part performs the signature verification to the boot program wrote into the built-in memory in the secure boot and starts the integrated circuit by using the boot program.

9. The integrated circuit according to claim 1, wherein when the security strength shown in the set value is less than the predetermined value, the start control part starts the integrated circuit by normal boot which not perform the signature verification.

10. The integrated circuit according to claim 1, wherein the security management part decrypts firmware loaded from an external device and performs the signature verification to the decrypted firmware.

11. The integrated circuit according to claim 1, wherein the set value holding part is a one time programable read only memory (OTPROM).

12. The integration circuit according to claim 1, further comprising a signal line for a control signal switching between the reset state and a reset release state.

13. A control method of an integrated circuit including a data processing part processing data and a security management part managing security of the data processing part, the security management part including an encryption unit which decrypts a boot program and a set value holding part which holds a set value of security strength and a secret key used in the encryption unit, the control method comprising:
a start control process where the integrated circuit is started by secure boot which performs signature verification on a boot program when the security management part previously holds a set value of security strength and the security strength shown by the set value is over a predetermined level; and
a connection control process where the security management part resets the data processing part when falsification of the boot program is detected by the signature verification in the secure boot.

* * * * *